(12) United States Patent
Lin

(10) Patent No.: US 7,097,336 B2
(45) Date of Patent: Aug. 29, 2006

(54) AUXILIARY LIGHT RING DEVICE FOR A VEHICULAR LIGHT

(76) Inventor: Yu-Chu Lin, No. 477, Chung Shan N. Rd., Yung Kang City, Tainan Hsien (TW)

(*) Notice: Subject to any disclaimer, the term of this patent is extended or adjusted under 35 U.S.C. 154(b) by 16 days.

(21) Appl. No.: 10/855,518

(22) Filed: May 28, 2004

(65) Prior Publication Data
US 2005/0265040 A1    Dec. 1, 2005

(51) Int. Cl.
F21V 29/00   (2006.01)
F21V 7/00    (2006.01)
F21S 13/14   (2006.01)

(52) U.S. Cl. .................. 362/544; 362/517; 362/518; 362/252

(58) Field of Classification Search .............. 362/545, 362/252, 544
See application file for complete search history.

(56) References Cited

U.S. PATENT DOCUMENTS

| | | | |
|---|---|---|---|
| 2,668,902 A * | 2/1954 | Fisher | 362/487 |
| 3,759,084 A * | 9/1973 | Plewka | 362/311 |
| 4,677,533 A * | 6/1987 | McDermott et al. | 362/240 |
| 5,685,637 A * | 11/1997 | Chapman et al. | 362/263 |
| 6,107,916 A * | 8/2000 | Beck et al. | 340/468 |
| 6,471,368 B1 * | 10/2002 | Lin | 362/216 |
| 6,491,417 B1 * | 12/2002 | Haen et al. | 362/485 |
| 6,520,666 B1 * | 2/2003 | Beyerlein et al. | 362/471 |
| 6,641,295 B1 * | 11/2003 | Hu | 362/545 |
| 6,789,929 B1 * | 9/2004 | Doong et al. | 362/511 |
| 6,871,988 B1 * | 3/2005 | Gebauer et al. | 362/511 |
| 6,910,791 B1 * | 6/2005 | Futami | 362/517 |
| 6,929,390 B1 * | 8/2005 | Amano | 362/545 |
| 2006/0067086 A1 * | 3/2006 | Hsu | 362/544 |

* cited by examiner

Primary Examiner—John Anthony Ward
Assistant Examiner—David Makiya
(74) Attorney, Agent, or Firm—Rosenberg, Klein & Lee

(57) ABSTRACT

An auxiliary light ring device for a vehicular light includes a light collective ring, a secondary reflecting cover and a plurality of emitting objects. The light collective ring is secured around the vehicular light. The secondary reflecting cover is secured to the inner wall of the light collective ring and comprises a plurality of arc-shaped reflecting bowls. Each reflecting bowl receives an emitting object therein. The light from the emitting objects is reflected by the reflecting bowls and collected by the light collective ring to enhance the light emission.

1 Claim, 3 Drawing Sheets

AUXILIARY LIGHT RING DEVICE FOR A VEHICULAR LIGHT

BACKGROUND OF THE INVENTION

1. Field of the Invention

This invention relates to an auxiliary light ring device for a vehicular light, and more particularly, to a vehicular light comprising a light collective ring and a secondary reflecting cover with emitting objects to enhance light emission.

2. Description of the Prior Art

Motor vehicles rely upon vehicular lights to drive in a dark or a foggy area. The vehicular lights not only can light the road situation but also provide the other side driver a signal of the coming vehicle.

However, most of the current vehicular lights are not light enough when encountering a foggy or a dark area, and may cause the driver to drive in a dangerous road situation.

SUMMARY OF THE INVENTION

It is the primary object of the present invention to provide an auxiliary light ring device for a vehicular light, which includes a light collective ring, a secondary reflecting cover and a plurality of emitting objects. The light collective ring is secured around the vehicular light. The secondary reflecting cover is secured to the inner wall of the light collective ring and comprises a plurality of arc-shaped reflecting bowls. Each reflecting bowl receives an emitting object therein. The light from the emitting objects is reflected by the reflecting bowls and collected by the light collective ring to enhance the light emission.

DETAILED DESCRIPTION OF THE PREFERRED EMBODIMENT

Figure 1:
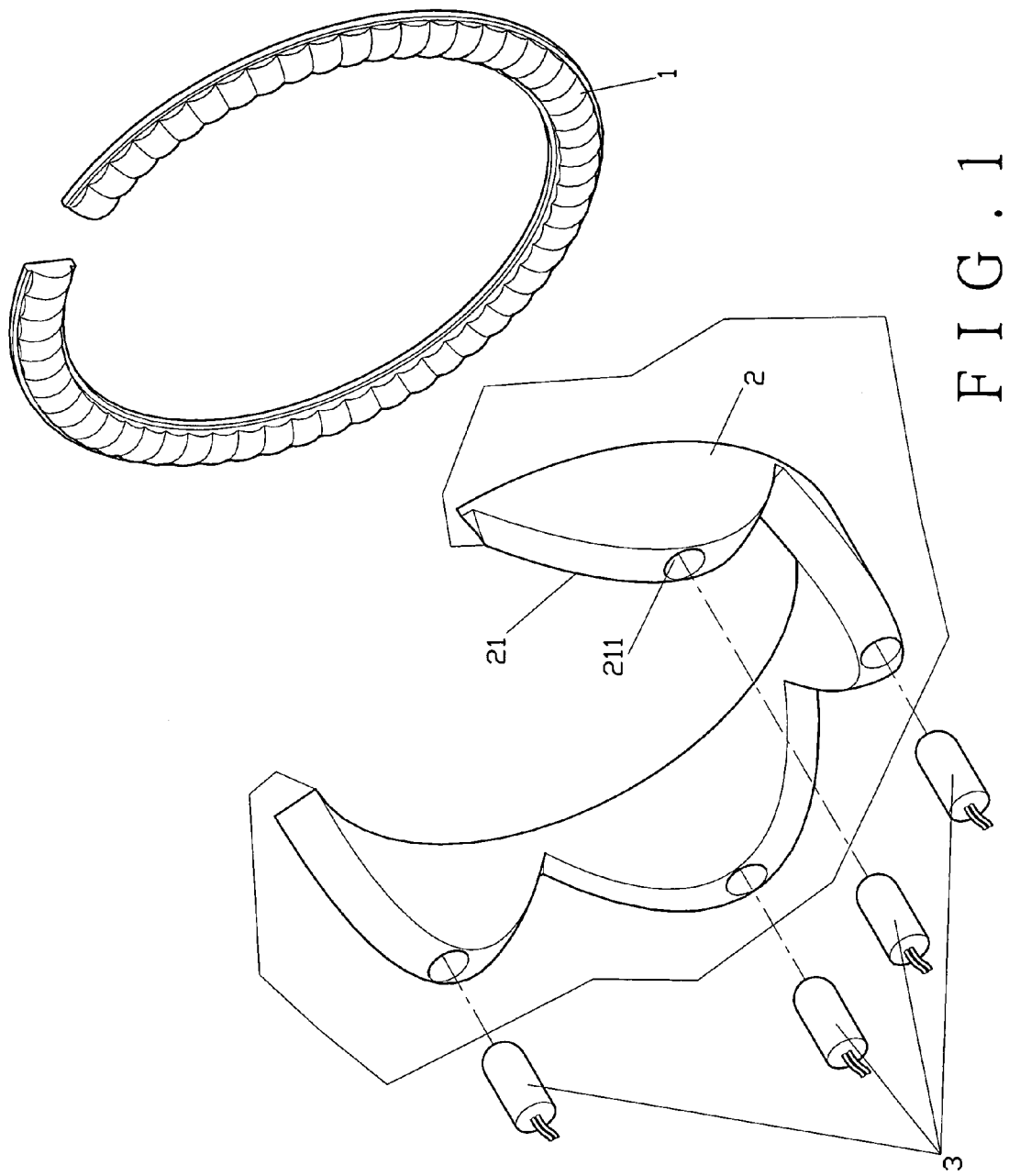
FIG. 1 is an exploded view of the present invention.
Figure 2:
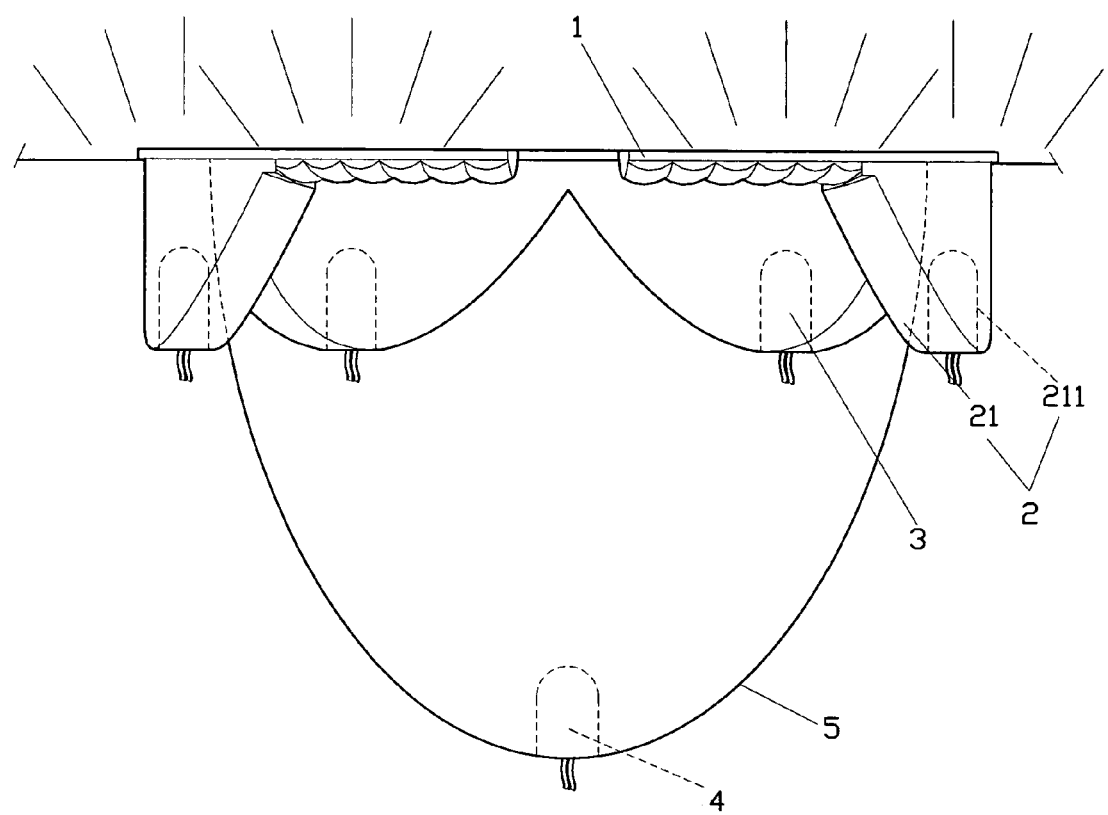
FIG. 2 is a side view of the present invention.

As shown in FIGS. 1 and 2, the present invention comprises a light collective ring 1, a secondary reflecting cover 2 and a plurality of emitting objects 3, and is incorporated with a vehicular light 4 and a first reflecting cover 5.

The light collective ring 1 is secured around the vehicular light 4. The secondary reflecting cover 2 is secured to the inner wall of the light collective ring 1. The secondary reflecting cover 2 comprises a plurality of arc-shaped reflecting bowls 21. Each reflecting bowl 21 comprises a hole 211 to receive an emitting object 3 therein.

Figure 3:
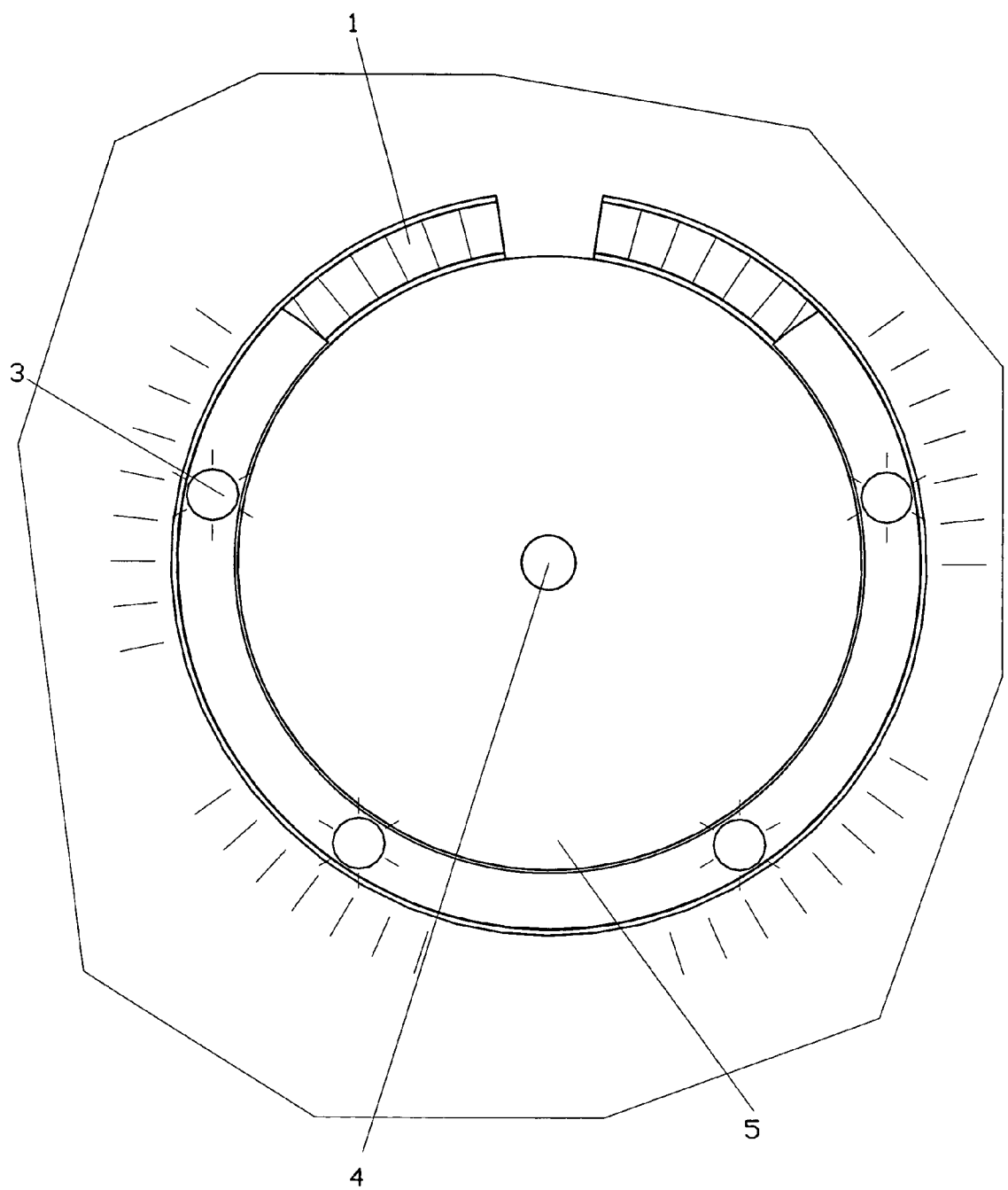
FIG. 3 is a front view of the present invention.

The light from the emitting objects 3, as shown in FIG. 3, is reflected by the reflecting bowls 21, and then is collected by the light collective ring 1 to form a circular light shining along the light collective ring 1.

What is claimed is:

1. An auxiliary light ring device for a vehicular light comprising a light collective ring, a secondary reflecting cover and a plurality of emitting objects, wherein said light collective ring is secured around the vehicular light and has an outer wall for emission of light therefrom and an opposing inner wall for receiving incident light, said secondary reflecting cover being secured to said inner wall of said light collective ring, said secondary reflecting cover comprising a plurality of arc-shaped reflecting bowls, each said reflecting bowl having a hole at a center portion to receive one said emitting object therein, said inner wall of said light collective ring facing said secondary reflecting cover and having a surface with a multiplicity of convex lens portions extending toward said arc-shaped reflective bowls in side-by-side relationship, a respective plurality of said convex lens portions being disposed in alignment with each of said arc-shaped reflecting bowls.

* * * * *